(12) United States Patent
Bartfai et al.

(10) Patent No.: US 6,381,643 B1
(45) Date of Patent: Apr. 30, 2002

(54) MECHANISM AND PROCEDURE FOR DETECTING SWITCH MIS-CABLING

(75) Inventors: Robert F. Bartfai, West Shokan; Carl A. Bender, Highland; Jay R. Herring; Nicholas P. Rash, both of Poughkeepsie; Kevin J. Reilly, Mahopac, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,545

(22) Filed: Nov. 8, 1999

(51) Int. Cl.⁷ ............................................. G06F 16/163
(52) U.S. Cl. ....................... 709/224; 709/227; 709/231; 370/245; 370/395.3; 370/471; 340/502; 340/686.1
(58) Field of Search ................................. 709/223, 224, 709/227, 228, 231, 245, 249; 370/242, 245, 248, 252, 395.3, 471; 340/502, 534, 686.1, 687

(56) References Cited

U.S. PATENT DOCUMENTS

| 4,246,442 A | * | 1/1981 | Hashimoto ................ 179/2 DP |
| 4,777,330 A | | 10/1988 | Nakayashiki et al. ..... 178/69 R |
| 4,970,466 A | | 11/1990 | Bolles et al. ................ 324/533 |
| 5,084,870 A | | 1/1992 | Hutchinson et al. ....... 370/94.1 |
| 5,228,072 A | | 7/1993 | Ingalsbe et al. ............... 379/21 |
| 5,271,000 A | | 12/1993 | Engbersen et al. ......... 370/244 |
| 5,410,551 A | | 4/1995 | Edwards et al. ............. 314/736 |
| 5,453,978 A | | 9/1995 | Sethu et al. ................. 370/254 |
| 5,678,005 A | * | 10/1997 | Taylor ......................... 709/224 |
| 5,805,589 A | | 9/1998 | Hochschild et al. ........ 370/389 |
| 5,928,374 A | * | 7/1999 | Shimizu et al. .............. 714/724 |
| 5,937,032 A | * | 8/1999 | Nummelin et al. ............ 379/10 |
| 6,078,596 A | * | 6/2000 | Wellbrock ................... 370/907 |
| 6,163,527 A | * | 12/2000 | Ester et al. .................. 370/228 |
| 6,285,293 B1 | * | 9/2001 | German et al. ............. 340/687 |

* cited by examiner

Primary Examiner—Binh Tieu
(74) Attorney, Agent, or Firm—Lawrence D. Cutter; Floyd A. Gonzalez; Fleit, Kain, Gibbons, Gutman & Bongini P.L.

(57) ABSTRACT

A method, and a system for implementing the method, for implementing the method, for determining if a wire has been miswired in a network comprising service nodes and switch elements. The method includes the steps of: (1) transmitting a transmission stream in an outbound route, (where this transmission stream includes one or more service node fields for one or more service nodes, one or more switch element fields for one or more switch elements connected to the one or more service nodes, and a port field for each the switch element); (2) if the transmission stream is received on a port at a the switch element different than a the port field for the switch element indicated by the transmission stream, then setting an error indicator in the transmission stream; (3) transmitting the transmission stream back to the one or more service nodes in a return route, where the one or more service nodes determine from the error indicator a miswired condition between the receiving switch element and a previous switch element or service node along the outbound route. The one or more service nodes can record, store and tabulate the miswired condition and one or more additional miswired conditions. The transmission stream can store the one or more switch element fields for the one or more switch elements and the port fields for each the switch element separately for a path comprising the outbound route and a path comprising the return route.

18 Claims, 5 Drawing Sheets

MECHANISM AND PROCEDURE FOR DETECTING SWITCH MIS-CABLING

BACKGROUND OF THE INVENTION

1. Field of the Invention

The following invention relates generally to cabling of wires, and more specifically to discovering and correcting mis-cabling of wires between switches in large scale super computers.

2. Trademarks

S/390, RS/6000, POWERparallel, Scalable POWERparallel Systems and IBM are registered trademarks of International Business Machines Corporation, Armonk, N.Y., U.S.A. and Lotus is a registered trademark of its subsidiary Lotus Development Corporation, an independent subsidiary of International Business Machines Corporation, Armonk, N.Y. Other names may be registered trademarks or product names of International Business Machines Corporation or other companies.

3. Related Art

In large scale computers or supercomputers, in addition to large scale networks, there are many connections between the switches. Large scale computers and large scale networks alike have many switch boards. The switch boards, in turn, include multiple switching elements (also called switches, or switch chips). There can be thousands of cable connections between these switch elements.

For a large scale computer, the cables run underneath a raised floor, or false floor. The cables can run 12 inches high, for example. Each cable has a set width. In a typical large scale computer, the widths can be up to one half inch for each cable, or even larger. The cables have end connections at the switch elements.

One or more sets of switch boards are connected to processing computers, which are also called service nodes. These processing computers transmit data to and receive data from the switch fabric, by having connections to the switch elements of these one or more sets of switch boards.

During initialization of the network, one or more processing computers transmit data streams to the switch fabric, to configure and setup communications between the processing computers and the switch elements. The trouble is that no satisfactory method exists for detecting when the cables running between the switch elements have been miswired during this initialization step, or at any other time. Miswires present a problem because processing computers generate routes that get data streams from a particular source to a particular destination based on the assumption that the cabling is correct. The "correct" cabling is designed to evenly distribute bandwidth between the processing computers. Due to the large number of wires and switch elements, this presents a problem in logistics and cost. What is needed is a cost effective, efficient, and automated method for discovering the miswiring of cables in large networks.

SUMMARY OF THE INVENTION

The present invention is directed to a method, and a system for implementing the method, for determining if a wire has been miswired in a network comprising service nodes and switch elements. The method includes the steps of: (1) transmitting a transmission stream in an outbound route, (where the transmission stream includes one or more service node fields for one or more service nodes, one or more switch element fields for one or more switch elements connected to the one or more service nodes, and a port field for each the switch element); (2) if the transmission stream is received on a port at a the switch element different than a the port field for the switch element indicated by the transmission stream, then setting an error indicator in the transmission stream; (3) transmitting the transmission stream back to the one or more service nodes in a return route, where the one or more service nodes determine from the error indicator a miswired condition between the receiving switch element and a previous switch element or service node along the outbound route.

The one or more service nodes can record, store and tabulate the miswired condition and one or more additional miswired conditions. The transmission stream can store the one or more switch element fields for the one or more switch elements and the port fields for each the switch element separately for a path comprising the outbound route and a path comprising the return route.

The switch element fields can be designated by one field indicating a switch board set and one field designating a switch element in the switch board set. The method can be performed during an initialization process for the network. The one or more service nodes can include one or more processing computers. The one or more service nodes can include a single service node designated as a primary service node. Also, the primary service node can be a single processing computer.

BRIEF DESCRIPTION OF THE DRAWINGS

The present invention will be described with reference to the accompanying drawings, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENT

In the following description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1A:
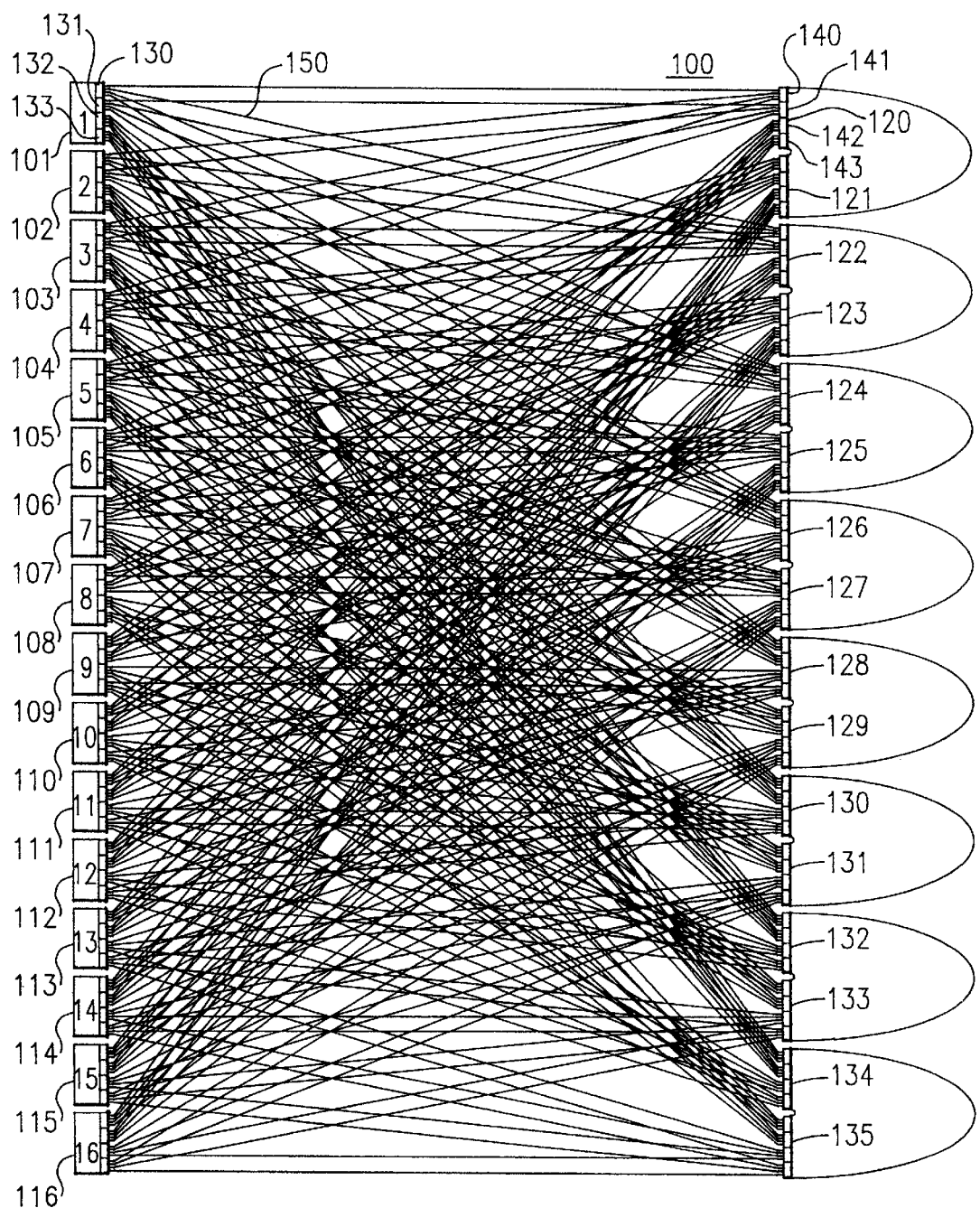
FIG. 1A is a graphical representation of a network found in a large scale computer, supporting 256 processing computers.

FIG. 1A is a graphical representation of a network 100. This network is found, for example, in a large scale computer, or a large scale super computer, or a large scale network. One type of supercomputer for which the present invention can be used is the IBM RS/6000 Scalable POWERparallel Systems SP supercomputer.

Network 100 includes a set of switch boards 101–116, another set of switch boards 120–135, and cables 150 running between the switch boards. Switch boards 110–116 comprise a switch board set (or frame). Switch boards 120–135 comprise a second switch board set. There can be many switch board sets. The cable, for example, is of a width up to approximately one-half inch, or even larger. Only a single cable 150 is labeled, although 256 cables connect switch boards 101–116 and 120–135 between one another The switch boards are actually aggregations of individual switch elements or switch chips. (These are referred to as switch elements hereinafter for consistency.) Referring to switch board 101, it comprises four switch elements 130, 131, 132 and 133 connected to other switch elements, and four switch elements connected to processing computers (not shown). (Refer to FIG. 1B below.)

In the illustrated embodiment, switch boards 101–116, each comprising sets of eight individual switch elements, for example, are connected to 16 processing computers each. The processing computers are not shown, but would be located to the left of switch boards 101–116 if illustrated. Since there are 16 switch boards (counting switch board 101 through switch board 116), there are a total of 256 processing computers. The processing computers provide data packets to and receive data packets from switch boards 101–116.

Switch boards 101–116 process and route the data received from the processing computers. Each switch board 101–116 has 16 ports for connections to 16 processing computers (not shown). In addition, each switch board 101–116 has 16 ports for connections to other switch boards 120–135. This is better understood by viewing the individual switch elements.

Figure 1B:
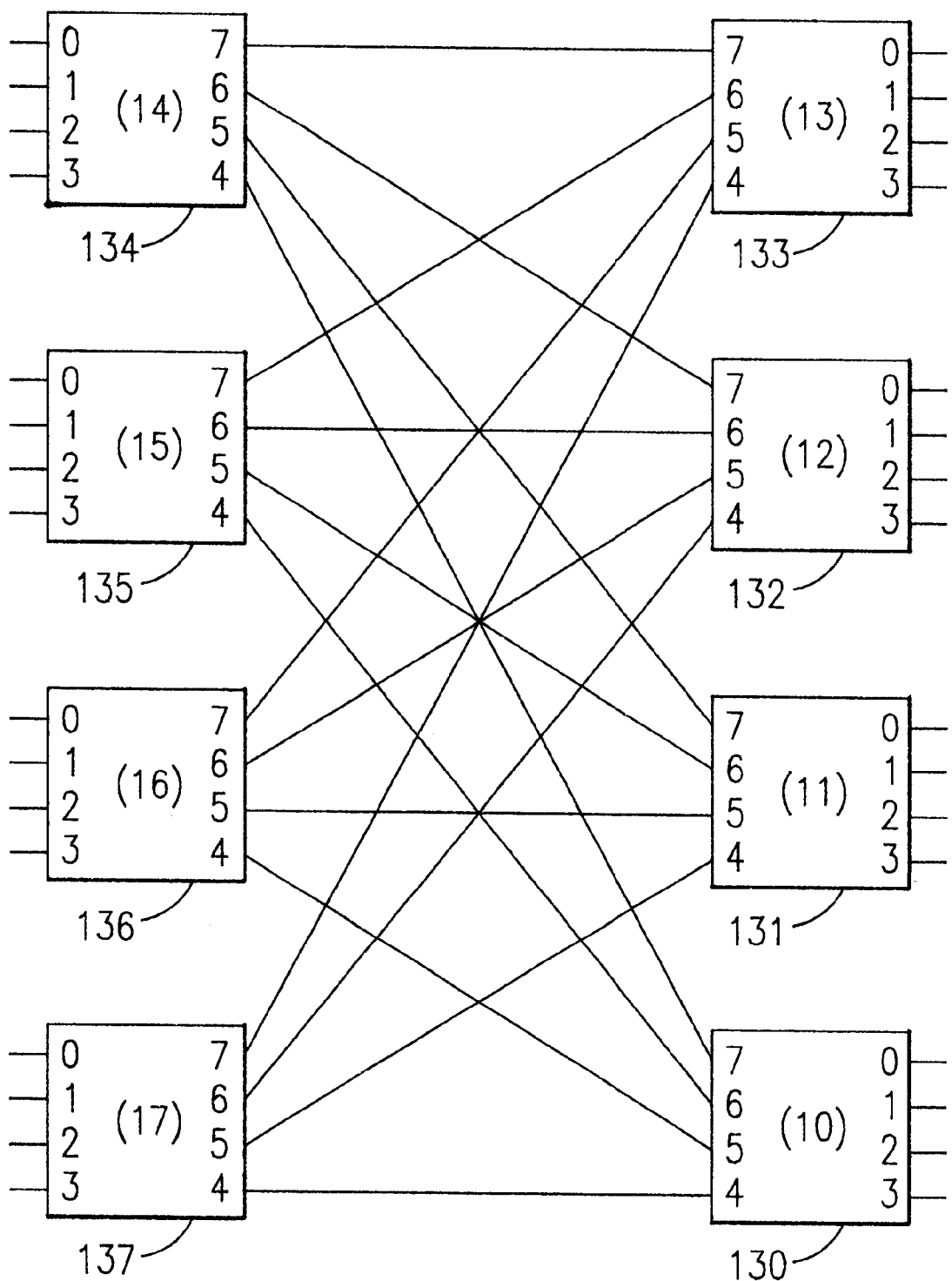
FIG. 1B is a graphical representation of a switch board.

As noted, each switch board includes 8 switch elements. Referring to FIG. 1B, switch board 101 is shown to comprise switch elements 130, 131, 132, 133, 134, 135, 136 and 137. Specifically, each of switch elements 130–133 includes 4 ports (ports 0–3) for connection to 4 processing computers (not shown). Also, each of switch elements 134–137 includes 4 ports (ports 0–3) for connection to other switches. Consequently, switch board 101 has 16 ports for connection to processing computers and 16 ports for connection to other switch boards, for a total of 32 ports. Therefore, the combined switch elements of switch boards 101–116 have a total of 512 ports, 256 ports for connections with other switch elements, and 256 ports for connection to processing computers. Switch board halves 120–135 comprise 8 switch boards that are connected to other switch boards, and not processing elements. For example, switch board halves 120, 121 comprise a single switch board. Like switch boards 101–116, each of these switch boards comprises 8 switch elements. As illustrated, switch board 120 includes switch elements 140, 141, 142, and 143. Each of switch board halves 120–135 comprises 4 switch elements having 8 ports each. Consequently, the combined switch elements of switch boards 120–135 include 512 ports.

Each processing element can also be referred to as a node. It is possible, through the mesh of cables shown, for each node to communicate with other nodes.

As noted, switch boards 120–135 are connected to other switch boards only, and not to processing elements. For example, switch board halves 120 and 121 together include 16 connections to any of switch boards 101–116. However, to their right, the switch board comprising halves 120, 121 also includes 16 connections to one or more switch boards (not shown).

Figure 2:
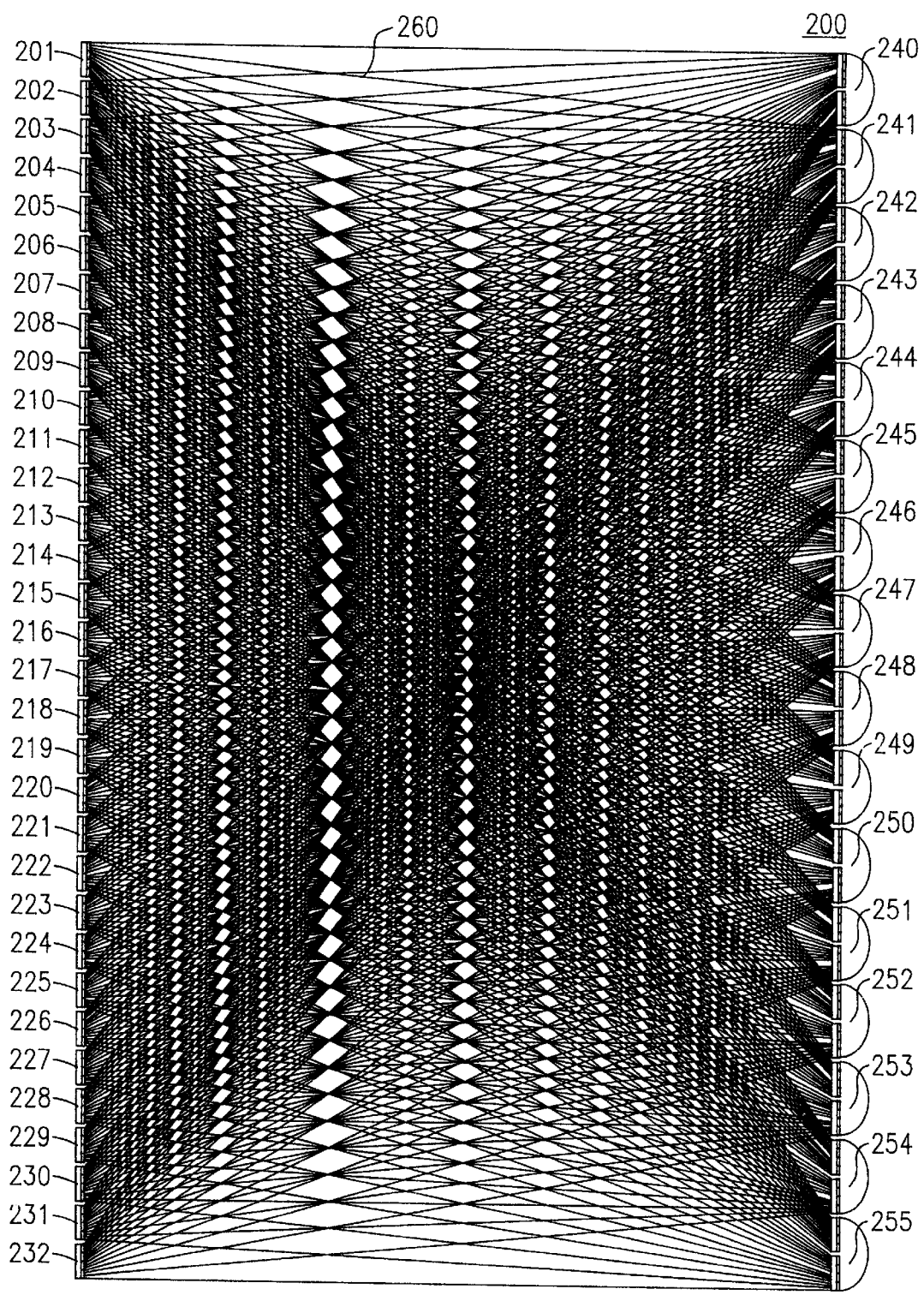
FIG. 2 is a graphical representation of a larger network found in a large scale computer, supporting 512 processing computers.

FIG. 2 is a graphical representation of a network 200. Like network 100, this network is also found, for example, in a large scale computer, or a large scale super computer, or a large scale network.

Network 200 is quite similar to network 100, but is larger in size and inter-connectivity. Network 200 supports twice as many processing computers as network 100, namely 512 processing computers.

Network 200 includes a set of switch boards 201–232, another set of switch boards 240–255, and cables 260 running between the switch boards. Switch boards 201–232 comprise a switch board set. The cable, for example, has a width up to approximately one-half inch. Only a single cable 260 is labeled, although 512 cables connect switch boards 201–232 and switch boards 240–255 between one another. Switch boards 240–255 comprise a second switch board set.

The switch boards are aggregations of individual switches (switch elements). In the embodiment illustrated, each switch board comprises 8 switch elements or switches.

Switch boards 201–232 are connected to 16 processing computers each. The processing computers are not shown, but would be located to the left of switch boards 201–232 if illustrated. Since there are 32 switch board, there are a total of 512 processing computers that provide data packets to and receive data packets from switch boards 201–232. The combined switch elements of switch boards 201–232 have a total of 1024 ports, 512 ports for connections with other switch elements, and 512 ports for connection to processing computers.

Switch boards 240–255 are of 32 switch boards, each of which is connected to other switch boards, and not processing elements. Each switch board 240–255 comprises 8 switch elements. As a result, network 200 is a network of twice as many cables (namely 512) supporting twice as many processing computers (namely 512) as network 100.

Figure 3:
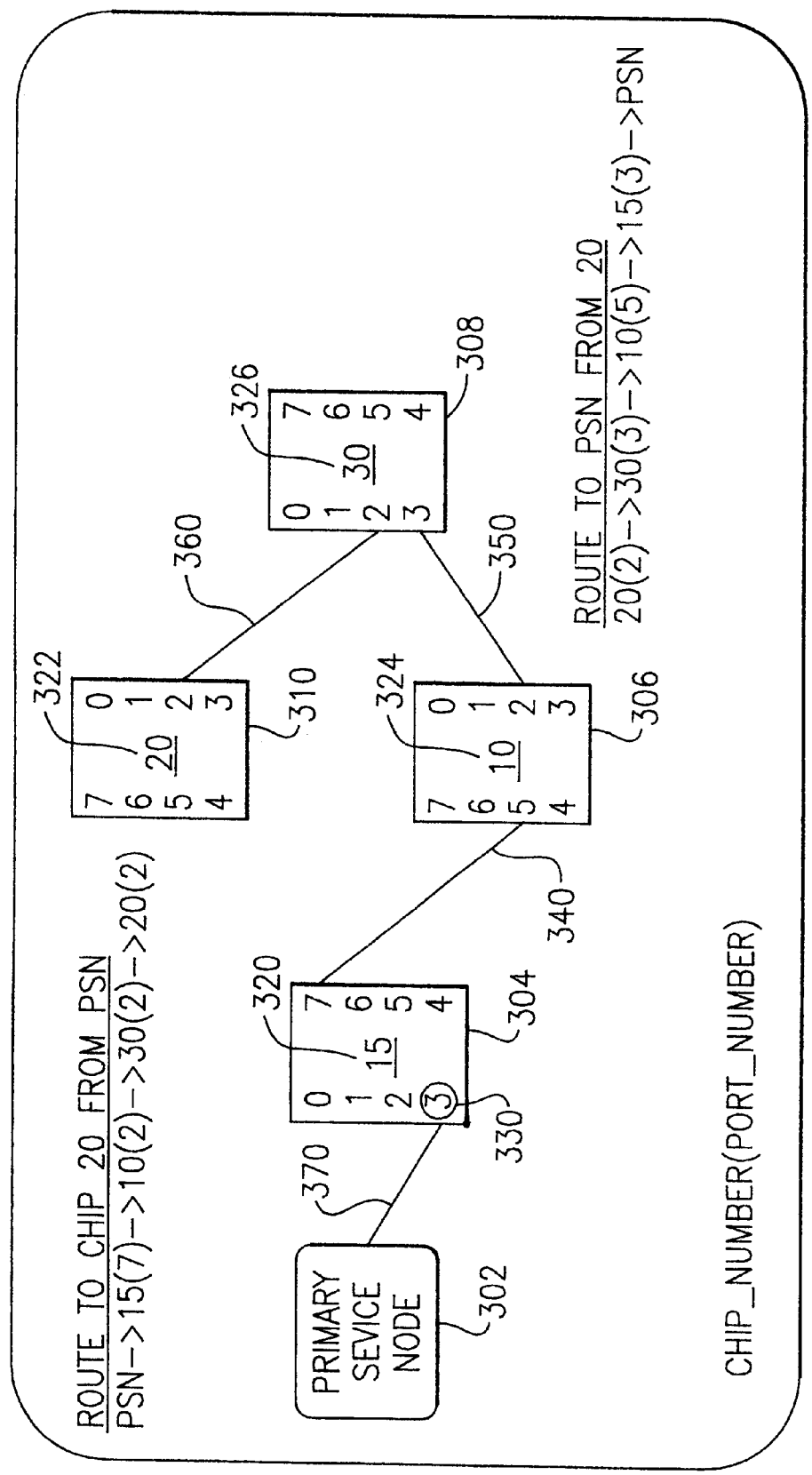
FIG. 3 is a graphical representation of a connection between switch boards of the networks of FIGS. 1 and 2.

FIG. 3 is a graphical representation of a connection between switch boards of either network 100 or network 200. FIG. 3 includes primary service node 302 and switch elements 304, 306, 308 and 310.

Switch element 304 includes ports 0–7, of which port 3 (labeled 330) is shown. Switch elements 306, 308, and 310 also have ports 0–7 each, as shown. (Switch elements 304, 306 are, for example, switch elements 134, 131 of FIG. 1B.)

Each switch element has a two digit descriptor denoting (1) the switch board set, and (2) the switch element of that switch board. Switch element 304 is denoted by descriptor 15, indicating that the switch board set is 1, and the switch element on switch board 1 is 5. Here, the switch board descriptor is a symbolic representation, meaning switch board set "1" represents switch board set 101–116 in network 100, for example. In network 100, switch boards 120–135 comprise a second switch board set, for example. Similarly, the switch element descriptor is a symbolic representation, meaning switch element "5" identifies switch element 304 of FIG. 3, which can be the fifth switch element of switch board set 101–116 in network 100, for example.

Switch elements 306, 308, 310 also have descriptors, as shown. Switch 306 is denoted by descriptor 10, indicating that the switch board set is 1, and the switch element on switch board set 1 is 0. Switch 308 is denoted by descriptor 30, indicating that the switch board set is 3, and the switch element on switch board set 3 is 0. Switch 310 is denoted by descriptor 20, indicating that the switch board set is 2, and the switch element on switch board set 2 is 0.

Between the switch elements are connections. Illustrated are connection 340 between switch elements 304 and 306, connection 350 between switch elements 306 and 308, and connection 360 between switch elements 308 and 310. In one embodiment, these connections are electrical connections between different ports of the switch elements.

Connection 340 is between switch element 304, having descriptor 15, and switch element 306, having descriptor 10. Since both of these switch elements are on the same switch board set, the connection is not a cable connection. In one embodiment, this connection is an electrical connection on a printed circuit board. This on-board connection is installed in a factory, and cannot be miswired, except during actual fabrication.

On the other hand, connection 350 is between switch element 306, having descriptor 10, and switch element 308, having descriptor 30. These switch elements are on different switch boards sets. Consequently, connection 350 is a cable connection. Similarly, connection 360 is between switch element 308, having descriptor 30, and switch element 310, having descriptor 20. These switch elements are on different switch board sets. Therefore, connection 360 is also a cable connection.

Primary service node 302 is a processing computer. Specifically, it is a processing computer responsible for setup and teardown of communications between all the switch elements and processing computers in the network. Primary service node 302 is connected by connection 370 to switch element 304.

When it is desirable to operate the network, initialization takes place. Upon "turning on" the computer system, a series of software and/or hardware modules in the processing computers intercommunicate to identify and configure the network elements (including the switch elements and the processing computers). This process is called initialization. Primary service node 302 runs the initialization process, traversing every switch element, switch element connection and service node in the network during network initialization.

FIG. 3 is used to illustrate the inventive mechanism for testing whether the cables running between the switch elements are miswired. For illustrative purposes, FIG. 3 shows only four switch elements (switch elements 304, 306, 308, and 310), whereas in reality there can be any number of switch elements connected to primary service node 302.

During initialization, a transmission stream is sent from primary service node 302 along connection 370 to switch element 304. In one embodiment, the transmission stream includes the switch elements and ports on these switch elements for a route. An exemplary transmission stream includes the outbound route

PSN→15(7)→10(2)→30(2)→20(2), where PSN is the primary service node 302, 15(7) represents port 7 of switch element 5 of switch board set 1 (switch element 304), 10(2) represents port 2 of switch element 0 of switch board set 1 (switch element 306), 30(2) represents port 2 of switch element 0 of switch board set 3 (switch element 308), and 20(2) represents port 2 of switch element 0 of switch board set 2 (switch element 310). This exemplary transmission stream also includes a return route. The return route is the transpose, or reverse, of the above route, namely

20(2)→30(2)→10(2)→15(7)→PSN where PSN, the ports, switch boards, and switch elements are the same as defined above.

In this embodiment, the transmission stream includes the outbound route and the return route in select, predefined fields. At each switch element, the transmission stream is observed to determine the next switch element along the route.

The outbound route is specifically described as follows. PSN 302 transmits the transmission stream to switch element 304 via connection 370. Switch element 304 receives the transmission stream on port 7, which is the port specified in the transmission stream. It then transmits the transmission stream to switch element 306 via connection 340. Switch element 306 receives the transmission stream on port 2, which is the port specified in the transmission stream. It then transmits the transmission stream to switch element 308 via connection 350. Switch element 308 receives the transmission stream on port 2, which is the port specified in the transmission stream. It then transmits the transmission stream to switch element 310 via connection 360. Switch element 310 receives the transmission stream on port 2, which is the port specified in the transmission stream.

In one embodiment, there is an indicator in the transmission stream indicating whether the transmission stream is being sent in the outbound route or in the return route. In the reverse route (i.e., the return route), the indicator is viewed by each switch element to determine the direction of the transmission stream. In another embodiment, whether the transmission stream is being sent in the outbound route or in the return route is stored by an indicator in the switch elements, themselves.

The return route is as follows. Switch 310 transmits the return transmission stream to switch element 308 via connection 360. Switch element 308 receives the transmission stream on port 2, which is the port specified in the transmission stream. It then transmits the transmission stream to switch element 306 via connection 350. Switch element 306 receives the transmission stream on port 2, which is the port specified in the transmission stream. It then transmits the transmission stream to switch element 304 via connection 340. Switch element 304 receives the transmission stream on port 7, which is the port specified in the transmission stream. It then transmits the transmission stream to primary service node 302 via connection 370.

In one embodiment, each switch element at the end of an outbound route determines whether the port of the switch element included in the transmission stream is the same as the actual port of the switch element on which the transmission stream is received. If this is the case, the switch element determines this condition, and transmits the transmission stream in the path indicated by its content, as noted above. If this is not the case, however, then the switch element sets an error indicator in the transmission stream indicating that the transmission stream was received on the wrong port. The switch element then sends back the transmission stream, with this error indicator set, on the return route. The primary service node reads the transmission stream, including the error indicator, to determine that the switch element that discovered the error is miswired to its previous connection.

Another embodiment is very similar to the above embodiment. Here, the transmission stream is directed along a set path of switching elements. For example, path PSN→15(7) →10(2)→30(2)→20(2) (in actuality, 20(2) is an input port and need not be specified in the route) is traversed. Only at the last switch element in the path (namely switch element 310, or 20(2)) is the error condition determined, and the error indicator set.

Figure 4:
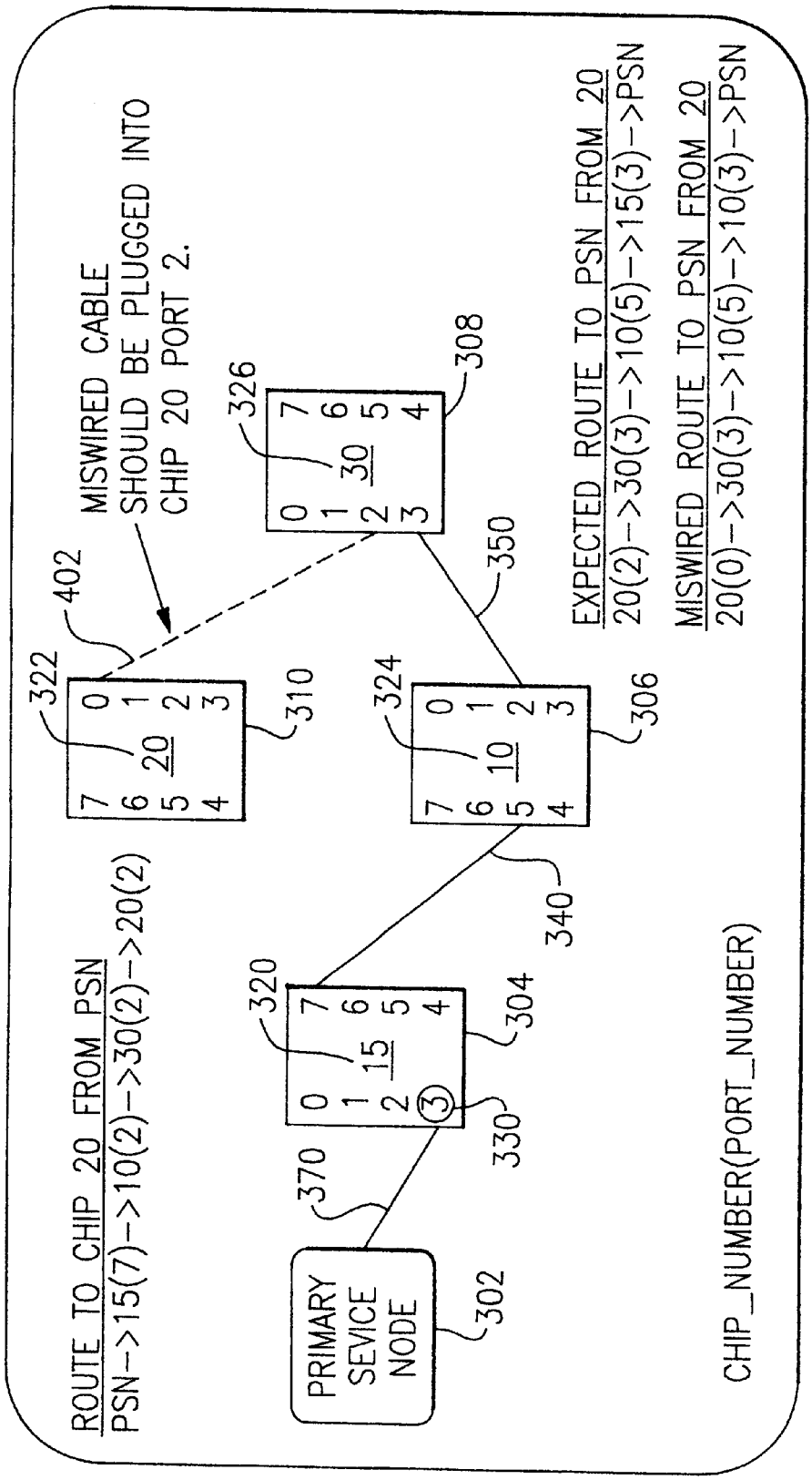
FIG. 4 is identical to the graphical representation of FIG. 3, except that two switch elements shown are miswired.

Both of these embodiments are better understood in view of FIG. 4. FIG. 4 is identical to FIG. 3, except that switch elements 308 and 310 are miswired. The miswired cable is labeled 402. The return route is the same as described with respect to FIG. 3, until the transmission stream arrives at switch element 308. Switch element 308 transmits the transmission stream to switch element 310 along connection 402. Switch element 310 receives the transmission stream on port 0 (i.e., at 20(0)) instead of port 2 (i.e., at 20(2)), as indicated in the transmission stream. It notes the discrepancy, and sets an error indicator in the transmission stream.

The transmission stream, with the error indicator set, is retransmitted in the reverse direction (i.e., the return route). The transmission stream is sent, in its first hop, from port 0 (i.e., the port that erroneously received the transmission stream) instead of port 3 (i.e., the port specified as the return route stream). Each switch element along the return route transmits the transmission stream, until it is received by primary service node 302.

Primary service node 302 checks the contents of the transmission stream, and discovers that switch elements 308 and 310 are miswired. Primary service node 202 records, stores, and tabulates all miswired switch elements for the computer system during initialization.

While the invention has been particularly shown and described with reference to preferred embodiments thereof, it will be understood by those skilled in the relevant art that various changes in form and details may be made therein without departing from the spirit and scope of the invention.

What is claimed is:

1. A method for determining if a wire has been miswired in a network comprising service nodes and switch elements, comprising the steps of:

transmitting a transmission stream in an outbound route, said transmission stream including one or more service node fields for one or more service nodes, one or more switch element fields for one or more switch elements connected to said one or more service nodes, and a port field for each said switch element;

if said transmission stream is received on a port at a said switch element different than a said port field for said switch element indicated by said transmission stream, then setting an error indicator in said transmission stream;

transmitting said transmission stream back to said one or more service nodes in a return route, wherein said one or more service nodes determine from said error indicator a miswired condition between said receiving switch element and a previous switch element or service node along said outbound route.

2. The method according to claim 1, wherein said one or more service nodes record, store and tabulate said miswired condition and one or more additional miswired conditions.

3. The method according to claim 1, wherein said transmission stream stores said one or more switch element fields for said one or more switch elements and said port fields for each said switch element separately for a path comprising said outbound route and a path comprising said return route.

4. The method according to claim 1, wherein said switch element fields are designated by one field indicating a switch board set and one field designating a switch element in said switch board set.

5. The method according to claim 1, wherein said method is performed during an initialization process for the network.

6. The method according to claim 1, wherein said one or more service nodes comprise one or more processing computers.

7. The method according to claim 1, wherein said one or more service nodes comprise a single service node designated as a primary service node.

8. The method according to claim 7, wherein said primary service node is a single processing computer.

9. The method according to claim 1, wherein if said transmission stream is received on a port at a said switch element different than a said port field for said switch element indicated by said transmission steam, then said step of transmitting said transmission stream back to said one or more service nodes comprises: transmitting said transmission stream from said received port.

10. A system for determining if a wire has been miswired in a network comprising service nodes and switch elements, comprising:

outbound transmitting device that transmits a transmission stream in an outbound route, said transmission stream including one or more service node fields for one or more service nodes, one or more switch element fields for one or more switch elements connected to said one or more service nodes, and a port field for each said switch element;

indicator device that sets an error indicator in said transmission stream if said transmission stream is received on a port at a said switch element different than a said port field for said switch element indicated by said transmission stream;

return route transmitting device that transmits said transmission stream back to said one or more service nodes in a return route, wherein said one or more service nodes determine from said error indicator a miswired condition between said receiving switch element and a previous switch element or service node along said outbound route.

11. The system according to claim 10, wherein said one or more service nodes record, store and tabulate said miswired condition and one or more additional miswired conditions.

12. The system according to claim 10, wherein said transmission stream stores said one or more switch element fields for said one or more switch elements and said port fields for each said switch element separately for a path comprising said outbound route and a path comprising said return route.

13. The system according to claim 10, wherein said switch element fields are designated by one field indicating a switch board set and one field designating a switch element in said switch board set.

14. The system according to claim 10, further comprising determining if the wire has been miswired in the network during an initialization process for the network.

15. The system according to claim 10, wherein said one or more service nodes comprise one or more processing computers.

16. The system according to claim 10, wherein said one or more service nodes comprise a single service node designated as a primary service node.

17. The system according to claim 16, wherein said primary service node is a single processing computer.

18. The system according to claim 1, wherein said return route transmitting device further comprises:

device that transmits said transmission stream from said received port, if said transmission stream is received on a port at a said switch element different than a said port field for said switch element indicated by said transmission steam.

* * * * *

UNITED STATES PATENT AND TRADEMARK OFFICE
CERTIFICATE OF CORRECTION

PATENT NO. : 6,381,643 B1
DATED : April 30, 2002
INVENTOR(S) : Bartfai et al.

It is certified that error appears in the above-identified patent and that said Letters Patent is hereby corrected as shown below:

Column 2,
Line 3, from "a the port" to -- the port --

Column 3,
Line 47, from "puters. Switch board" to -- puters. --
(START NEW PARAGRAPH) -- Switch board --

Column 7,
Line 20, from "service node 202" to -- service node 302 --

Column 8,
Line 65, from "mission steam" to -- mission stream --

Signed and Sealed this

Sixteenth Day of July, 2002

Attest:

JAMES E. ROGAN
Attesting Officer
Director of the United States Patent and Trademark Office